United States Patent [19]
Rydell

[11] Patent Number: 5,388,367
[45] Date of Patent: Feb. 14, 1995

[54] SHEATH-GUARD

[75] Inventor: Theodore B. Rydell, Rte. 2, Box 192B1, Shawano, Wis. 54166

[73] Assignee: Theodore B. Rydell, Shawano, Wis.

[21] Appl. No.: 61,452

[22] Filed: May 17, 1993

Related U.S. Application Data

[63] Continuation-in-part of Ser. No. 922,498, Jul. 31, 1992, abandoned.

[51] Int. Cl.⁶ ............................................. A01K 91/00
[52] U.S. Cl. .................................... 43/43.2; 43/42.1; 43/42.42
[58] Field of Search ................ 43/42.1, 42.4, 42.42, 43/42.43, 42.26, 42.24, 57.1

[56] References Cited

U.S. PATENT DOCUMENTS

| | | | |
|---|---|---|---|
| 801,437 | 10/1905 | Baker | 43/43.6 |
| 2,589,435 | 3/1952 | Roeben | 43/42.1 |
| 2,700,244 | 1/1955 | Greenwood | 43/57.1 |
| 3,670,445 | 6/1972 | Borger | 43/57.1 |
| 3,670,446 | 6/1972 | Wheeler | 43/42.43 |
| 4,312,148 | 1/1982 | Hardwicke, III | 43/42.24 |
| 4,869,013 | 9/1989 | Stickler | 43/42.4 |

FOREIGN PATENT DOCUMENTS 129448  9/1950  Sweden ............................ 43/43.16

*Primary Examiner*—P. Austin Bradley
*Assistant Examiner*—Chuck Y. Mah

[57] ABSTRACT

A fishing lure which has at least one hook and the hook or hooks are provided with a sheath-guard that serves as a sheath for the hook to prevent the hook(s) from catching on things and from entanglement with other hooks and further protects the sharpness of the hook by encasing the point of the hook. The sheath-guard, when it does not form a sheath for the hook, serves as a guard for the hook. The sheath-guard also serves numerous fish attracting functions in lures in which it is incorporated.

18 Claims, 11 Drawing Sheets

SHEATH-GUARD

This is a continuation-in-part of Ser. No. 07/922,498, filed Jul. 31, 1992, now abandoned.

BACKGROUND

Fishing lures that have a hook or hooks as part of their construction have suffered from problems that have, for centuries, vexed those using the lures.

One such problem is that the hooks tend to catch upon nearly everything that they come into contact with. The tendency of hooks to entangle with each other and to hook into anything that they come into contact with is a problem that persists to this day.

A second problem found in fishing lures, having hooks as a part of their structure is that hooks, in order to perform at their best, must be very sharp. Very sharp hooks not only aggravate the problems described above, but they are subject to being dulled or blunted in storage and in handling.

A third problem found in fishing lures having hooks as a part of their structure is that the hooks tend to snag and catch upon underwater objects when the lures are in use for fishing.

HISTORY OF THE INVENTION

Fish hooks have been in nearly universal use for centuries. There have been thousands of attempts to provide fish hooks with guards and sheaths. The absence of a widely accepted weed guard and/or sheath for fish hooks is clear testimony to the long felt need for such guards and sheaths, as well as the many attempts and failures of others to provide such a guard and sheath.

There are weed guards and hook sheaths available to fishermen. One form of a hook sheath is made by stripping the plastic insulation off of electrical wire and cutting the tubular plastic into short lengths that are then slipped over the points of large hooks to protect them and preserve the sharpness of the point of the hook. These hook protectors work fairly well, but are easily lost, and are a bother to put on and take off. The art is provided with an abundance of weed guards for hooks. Some of these weed guards prevent the snagging of the weeds quite well. However, in order to be widely accepted by fisherman such weed guards; should be durable, should not become misaligned and inoperative, should not impair the action of the lure, should not interfere with the hooking of a fish or the removal of the hook from the fish, should not be unattractive to fishermen, and should be convenient and unobtrusive to use. Most of the weed guards presently available in the art are deficient in one or more of the above attributes.

BRIEF DISCUSSION OF THE PRIOR ART

Nearly all of the elements of this invention and nearly all of the functions performed by the elements of this invention have long been widely known and available in the art. The novelty of this invention lies in the combinations of elements of this invention and their modes of operation and interaction.

For example; as stated above, it is known in the art to use home made sheaths for protecting very sharp hooks from being dulled in storage and handling and for protecting the user from injury in handling a lure having such sharp hooks. It is also known in the art to incorporate into a lure structure, weed guards into which a hook can be embedded (thereby dulling the hook to some degree). U.S. Pat. No. 4,312,148 to Hardwicke, III and U.S. Pat. No. 3,670,446 to Wheeler are patents that teach such guards. It is also known in the art to employ a coil spring secured to a lure structure as a weed guard. U.S. Pat. No. 1,854,028 to Gruenhagen is a patent that teached the use of a coil spring attached to the structure of a lure as a weed guard. The prior art known to the inventor does not provide the combination of a resilient sheath-guard which has at the unfixed end an open hollow sheath and at the fixed end a flexible resilient shaft secured to a lure structure and whereby the resilient sheath guard serves as a hook point sheath and hook point protector when the lure is not in use and as a weed guard when the lure is in use.

It is further well known in the art to provide fishing lures with structures and mechanisms that are fish attractants. It is well known that fish are attracted by; movement both regular and irregular, sound, light both reflected and emitted, smell and taste. It is well known in the art to incorporate into a fishing lure, elements that provide or produce one or more of there fish attractants.

U.S. Pat. No. 3,807,079 to Goforth teaches the use of a combination of fish attractants in combination with a hook that is provided with a weed guard. U.S. Pat. No. 2,911,753 to Beckett teaches a lure which provides a combination of movement and light producing attractants with hooks having weed guards and to which a bait capable of providing taste and smell attractants to the lure is attached.

The sheath-guard of this invention provides additional novelty to the lures which provide fish attractants in that the weed guard of the invention provides sonic and motion-type attractants to the lure of which it is a part. Further novelty is provided by the sheath-guard of this invention in that it cooperates with and participates in the fish attracting actions of other fish attractants which are a part of a lure that is provided with the sheath-guard of this invention.

OBJECTS

It is, therefore, an object of this invention to provide, to a hook structure of a fishing lure, elements that provide; a protective sheath for the hook point at the times that it is not in use, a weed guard for times that the lure is in use, an additional fish attractant to the lure, and which is capable of interacting with fish attractant components of a fishing lure in a synergistic fashion.

It is further an object of this invention to provide the elements for a sheath-guard described above wherein the sheath-guard is of low cost and simple construction and does not add excessive cost to the lure to which it is attached.

It is further an object of this invention to provide the elements for a sheath-guard described above wherein the sheath guard provides multiple fish attracting properties to the lure to which it is attached.

It is further an object of this invention to provide the elements for a sheath-guard described above wherein the sheath-guard is capable of interacting with other fish attractants provided by the lure to which it is attached.

It is further an object of this invention to provide the elements for a sheath-guard described above wherein the sheath-guard is very versatile and may be given diverse configurations to achieve numerous utilities, and achieve multiple ends.

Further objects will be made apparent by the following specifications, drawings, and claims.

TERMINOLOGY

The term "hook" as used herein shall be read to mean; "a fish hook formed from a metallic wire and having a point segment, a shank segment and having a bend segment located between the point segment and the shank segment and wherein the bend segment defines an ark of approximately 180 degrees and the shank segment is longer than the point segment".

The term "sheath" as used herein shall be read to mean; "a resilient hollow encasement for receiving a sharp implement which can not be readily penetrated through by a sharp implement whereby the encasement encloses the sharp parts of the implement so that sharp parts of the implement are prevented from being harmed and from doing harm".

The term "coil spring as used herein shall be read to mean; "a hollow resilient tubular body formed by juxtaposing successive coils of a resilient material such as plastic or metallic wire about a central axis".

The term "lure" as used herein shall be read to mean; "a means for attracting a fish to hook".

The term "shaft" as used herein shall be read to mean; "a flexible resilient material which provides the support for a sheath-guard and is fixed to a lure at one end and has a sheath affixed to it at the unfixed end and is comprised of one of the following group of materials to include tempered wires, braided wires, coiled rods, tempered flat metallic springs, flat polymeric materials, reinforced polymeric materials, polymeric rods, polymeric tubes and combinations thereof".

When referring to the positional relationship between the sheath-guard of this invention and the point of a hook the expression "direction in which the point is directed" shall be read to mean the direction that would be indicated by the point of the hook if the point of the hook, were the point of a directional arrow.

BRIEF DESCRIPTION OF THE INVENTION

The invention in one of its simplest forms comprises; a fishing lure, having at least one hook; said hook having a shank, a bend and a point, and said lure having a sheath-guard in the form of a resilient hollow sheath segment and a flexible resilient shaft segment, and with the shaft segment being positionally fixed to the lure at a point of attachment on the fishing lure at a location in the direction in which the point of the hook is directed and the sheath-guard has a length greater than the distance between the point of attachment and the point of the hook, such that the point of the hook is insertable into the encasing sheath and is retained therein when the hook is not in use and said sheath-guard is further positionally fixed so that when the point of the hook is not retained in the encasing sheath, the sheath-guard is positioned so as to serve as a weed guard for the hook.

DETAILED DESCRIPTION

Figure 1:
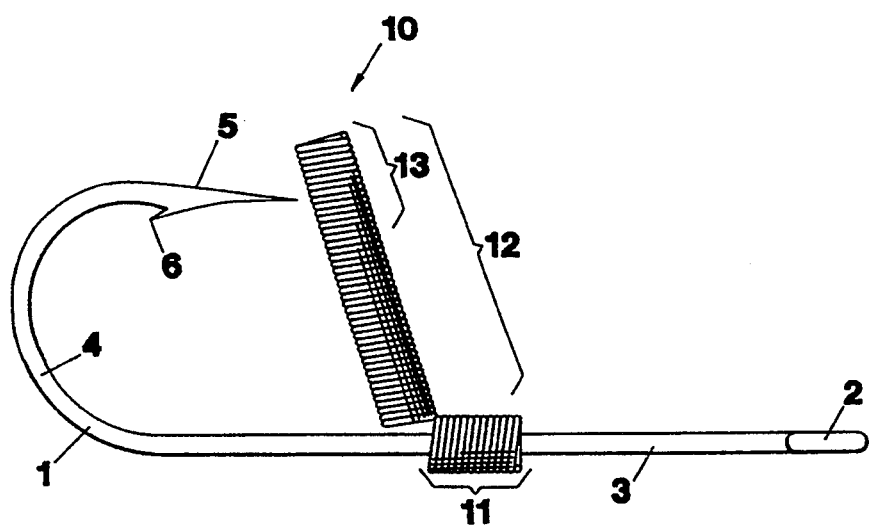
FIG. 1 is an elevational view of a lure incorporating a sheath-guard of this invention and showing a sheath-guard in the guard position.

In the drawings like numbers refer to like objects and the proportions of some elements have been changed for ease of illustration.

An unadorned hook is not considered to be a fish attractant. When a hook is combined with a fish attractant, the combination is called a fishing lure. When things work as intended, the attractant or attractants draw the fish to the lure whereupon the fish takes the lure into its mouth and is subsequently impaled on the hook.

Figure 2:
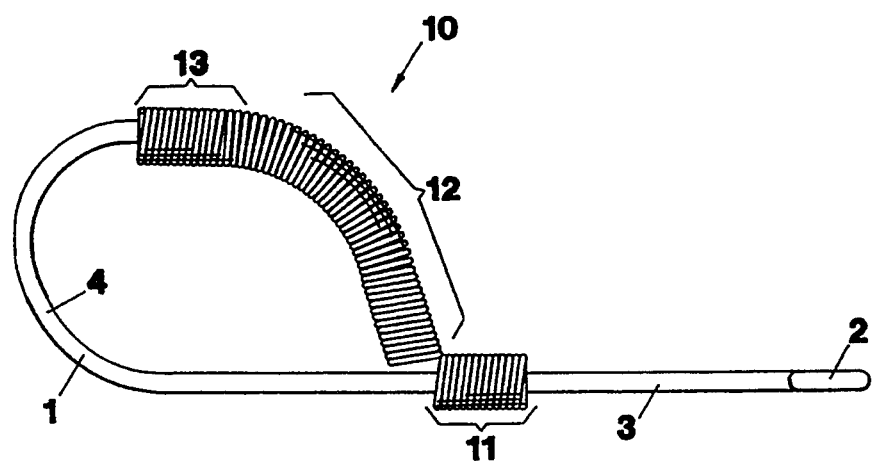
FIG. 2 is and elevational view of the lure of FIG. 1 showing a sheath-guard in the sheath position.

Referring now to FIGS. 1 and 2 which show the invention in a preferred embodiment wherein a minimal number of elements required to practice the invention is shown. Hook 1 has as a part thereof, eye 2, shank 3, bend 4, point 5 and barb 6. Coil spring 10 is secured to shank 3 of hook 1. To assemble the two components of this embodiment, a number of coils of coil spring 10 are passed over point 5 and barb 6 of hook 1 and then two adjacent coils of coil spring 10 are separated to permit point 5 of hook 1 to exit coil spring 10 thereby dividing coil spring 10 into segments, a shank segment 11 and a guard segment 12. The first few coils of the free end of guard segment 12 form sheath segment 13. Coil spring 10 is formed from a length of metal wire which is resilient and which is corrosion resistant. Most wires suitable for use in spring 10, such as stainless steel wire or piano wire are either corrosion resistant or can readily be rendered corrosion resistant by the application of a suitable coating. Such wire is normally reflective and the reflectivity of coil spring 10 is an attribute that renders spring 10 a fish attractant.

When spring 10 is in the guard configuration, as shown in FIG. 1, and hook 1 is being drawn through the water, spring 10 will bend and oscillate in response to the movement of the water past and through guard segment 12 of coil spring 10, thereby giving to the combination of hook 1 and coil spring 10, a movement type fish attractant, and a moving type light reflective fish attractant. Further, the water passing over and through coil spring 10 creates a sonic vibration that is also a fish attractant.

It should be noted that it is common practice to attach a bait, as a fish attractant, to a hook to make the hook a fishing lure. The fish attractants of taste, smell, motion, as well as other attractants peculiar to the particular bait used, are readily provided to the fishing lures of this invention by means of attaching a bait to a hook which is a part of this invention. The combination thus made may then be fished under circumstances which render it impractical to fish a baited hook alone in those circumstances.

Figure 3:
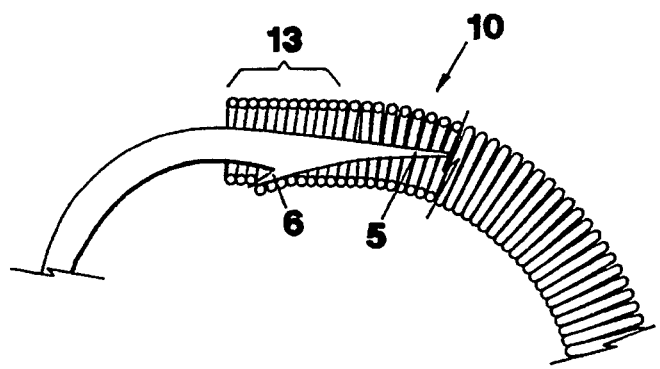
FIG. 3 is a fragmentary, partially sectioned view of the sheath segment of FIG. 2 showing the condition that prevails when a sheath-guard is larger than the hook barb.
Figure 4:
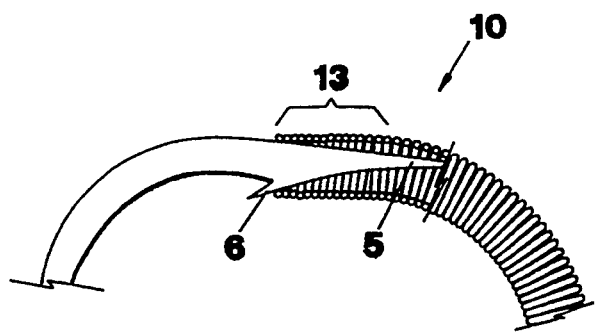
FIG. 4 is a fragmentary, partially sectioned view of the sheath segment of FIG. 2 showing the condition that prevails when a sheath-guard is smaller than the hook barb.

When the sheath-guard of this invention is in the sheath configuration as shown in FIG. 2, the sheath segment 13 of guard segment 12 encases the point 5 of hook 1 as is shown in greater detail in FIGS. 3 and 4.

As shown in FIG. 3, barb 6 enters into a latching engagement with coil spring 10 by means of barb 6 obtaining a position between two adjacent coils of sheath segment 13 of spring 10 and being retained there by the resilience of spring 10 urging sheath segment 13 of spring 10 against barb 6 and away from point 5. To remove point 5 of hook 1 from sheath segment 13 of coil spring 10, sheath segment 13 is pressed away from barb 6 and point 5 is thereafter withdrawn from sheath segment 13. This reversible latching engagement of a coil spring sheath with the barb of a fish hook, is believed by its inventor to be novel in the art.

As shown in FIG. 4, the barb 6 of hook 1 enters into latching engagement with coil spring 10' by means of barb 6 frictionally engaging the outsides of the outermost coil of sheath segment 13. It should be noted that when spring 10' has an inside diameter that is smaller than the largest transverse diameter of barb 6 that the tendency of spring 10' to seek to straighten out is sufficient to maintain sheath segment 13 securely in place over hook point 5. It should further be noted that, in the configuration shown in FIG. 4, the point 5 of the hook 1 is fully protected by the inside of sheath segment 13 and does not contact the inside of sheath segment 13 and the sharp point of the hook is thereby protected and preserved.

It should be noted that when the sheath-guard of this invention is in the configuration shown in FIG. 2, entry into bend 4 of hook 1 is limited. The tendency of hooks to link together and become entangled is a vexatious problem that has plagued fishermen since the advent of the fish hook. Lures having hooks having sheath-guards made according to this invention, and in place in the configuration shown in FIGS. 2, 3, and 4 of the drawings, do not exhibit a tendency to link together and become entangled.

EXAMPLES

A man placed in his pants pocket, six different lures made according to this invention and having their hooks sheathed by sheath-guards made according to this invention. For two hours he moved about in his normal routine, pausing from time to time to remove one or more lures, singly, from his pocket and to examine the lure(s) and thereafter return them to his pocket. At the end of that time the lures were removed from the pants pocket. No tendency of the lures to link together or entangle was noted. No damage was done to the lures or the hook points. No damage was done to the pants pocket or the man. The inventor believes that his invention of lures having hooks that, when sheathed by the sheath-guard of this invention, do not link together or become entangled is novel in the art.

As shown in FIGS. 1 and 2, shank 3 of hook 1 passes between two adjacent coils of coil spring 10 and coil spring 10 is thereby held in place on shank 3 of hook 1. This means of attachment is serviceable. However a more positive securement of shank segment 11 of coil spring 10 to shank 3 of hook 1 can be obtained by soldering or by epoxying the two members together. These methods of securement are quite satisfactory. However, a novel method of securing shank segment 11 of coil spring 10 to shank 3 is illustrated in FIG. 5.

Figure 5:
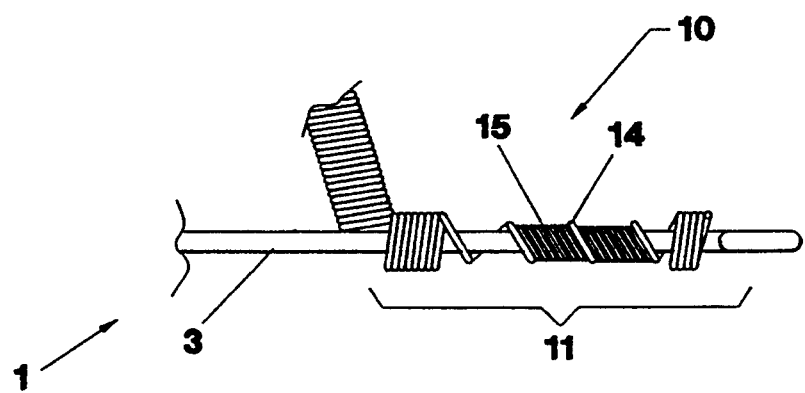
FIG. 5 is a fragmentary, partially sectioned view of a means for securing a sheath-guard of this invention to the shank of a hook.

As shown in FIG. 5, individual coils 14 of shank segment 11 of coil spring 10 are separated by stretching and a thread 15, such as the size A thread used in jig tying, is spirally wrapped around shank 3 between adjacent coils 14. Thread 15 frictionally engages shank 3 so as to prevent the rotation or translation of shank segment 11 of coil spring 10 about shank 3 of hook 1. A fly tying varnish such as vinyl head cement is then applied to the wraps of thread 15 by methods well known in the fly tying art, to create a secure attachment of shank segment 11 to shank 3. This quick, convenient, and economical method of securing a coil spring sheath-guard to a shank of a hook is believed by its inventor to be novel in the art.

The invention in its simplest form has been disclosed above. However, the basic invention enables many novel combinations and interactions of the inventive features of this invention with elements of the known fishing lure art. A representative sample of many such combinations follows hereinafter.

Figure 6:
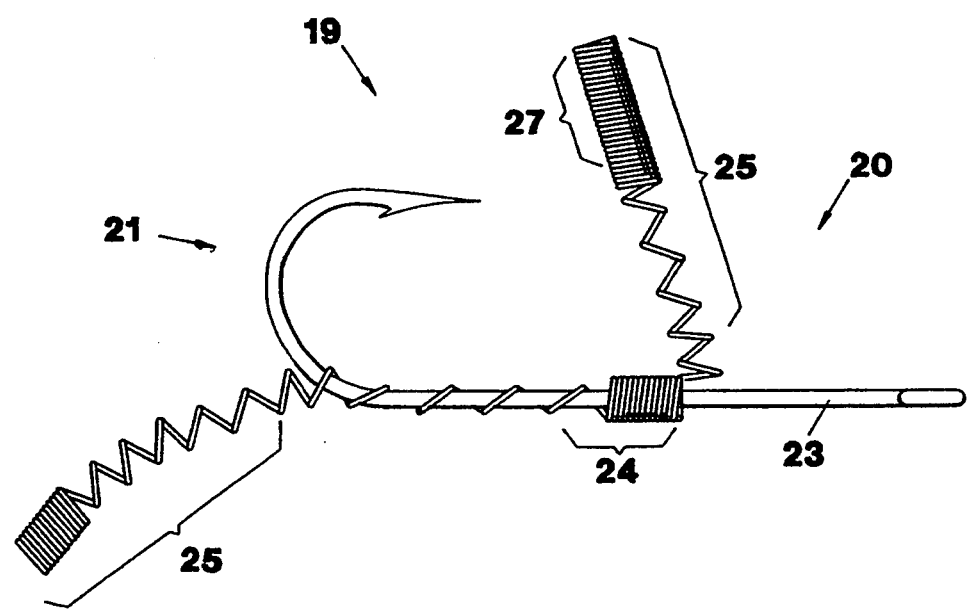
FIG. 6 is an elevational view of a lure embodying a sheath-guard of this invention.

It is well known in the art that a lure having wires that can be induced to vibrate at amplitudes that render their movement visible, are good fish attractants. FIG. 6 illustrates how the coil spring element of the lure of this invention can be "tuned" to vibrate at amplitudes in the visible range.

Referring now to FIG. 6 wherein lure 19 has a hook 21 having shank 23, which has secured thereon coil spring 20 as shown. Coil spring 20 is divided into three segments; a central shank segment 24, a sheath-guard segment 25, and a tail segment 26 as shown. Sheath-guard segment 25 is shown to be stretched so that the end coils remain closely wrapped to form sheath segment 27, but the coils between the point of attachment to hook shank 23 and sheath segment 27 form a series of open spiral coils. When coils of a sheath-guard are close together, they tend to damp out vibrations. However, when the coils are stretched as shown in FIG. 6, the coils tend to vibrate with an amplitude of vibration that is in the visible range. Tail segment 26 can also be stretched to cause it to vibrate in the visible range when the lure 19 is pulled through the water. The amplitude of and frequency of vibration of the sheath-guard segment 25 and the tail segment 26 may be altered or "tuned" by stretching or compressing the open spirals of those segments. The inventor believes that his invention of a tunable sheath-guard lure is novel in the art.

Figure 7:
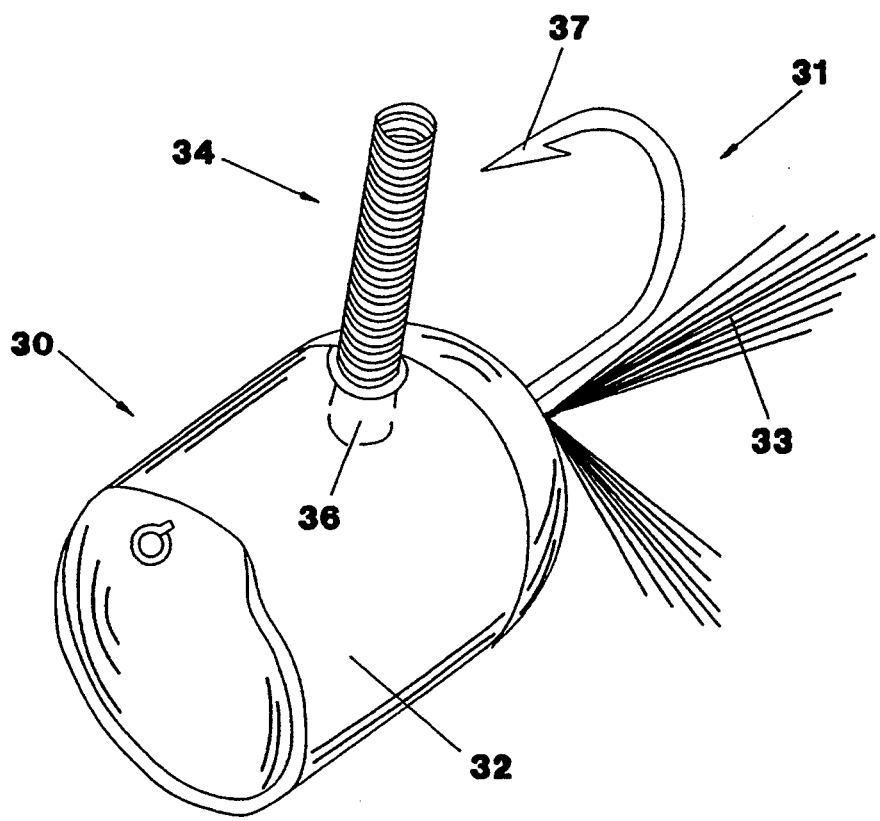
FIG. 7 is a pictorial view of a lure embodying a sheath-guard of this invention.

Referring now to FIG. 7, wherein lure 30 is a well known popper lure having a hook 31, a fish attractant body 32 and fish attractant 33. FIG. 7 serves to illustrate that it is within the scope of this invention to attach a sheath-guard at a location on a lure which is not the shank of a hook but which is a part of the lure. Lure 30 is provided with an attachment hole 36, shown in dashed lines, into which sheath-guard 34 is cemented thereby providing lure 30 with a sheath-guard made according to this invention wherein the sheath-guard is attached to the lure at a location that is fixed relative to hook 31 and at a location that is distant from the point 37 of hook 31 and in the direction in which point 37 is directed. The inventor believes that his invention of a means for affixing a coil spring sheath-guard directly to the body of a lure is novel in the art.

Figure 8:
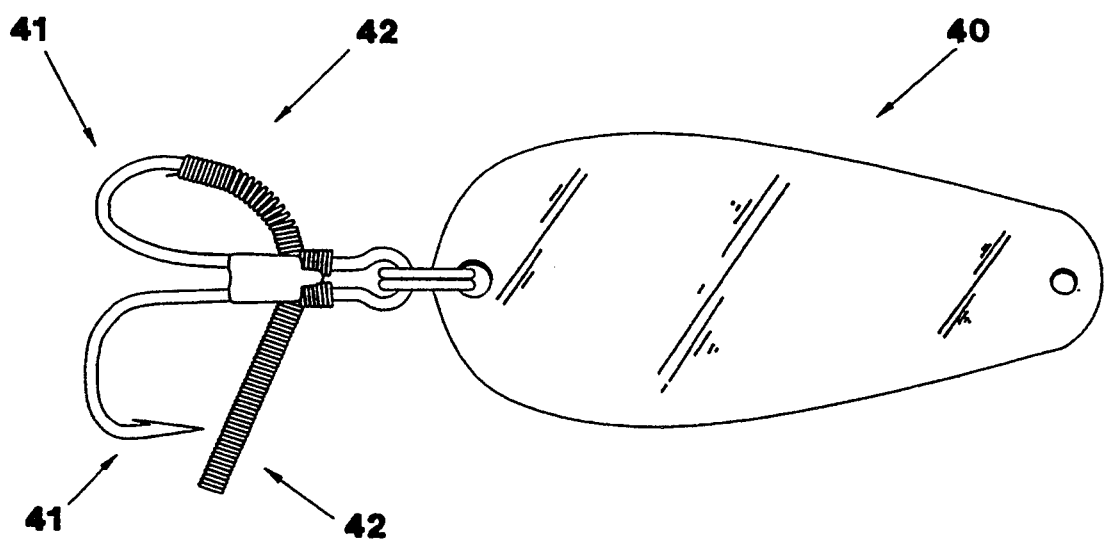
FIG. 8 is a pictorial view of a lure having multiple hooks and multiple sheath-guards.

Referring now to FIG. 8 wherein an underwater lure 40 which is of the spoon type is shown to have multiple hooks 41 an each hook 41 is provided with a sheath-guard 42. FIG. 8 serves to illustrate that it is within the scope of this invention to provide lures which have multiple hooks with multiple sheath-guards for the hooks.

Figure 9:
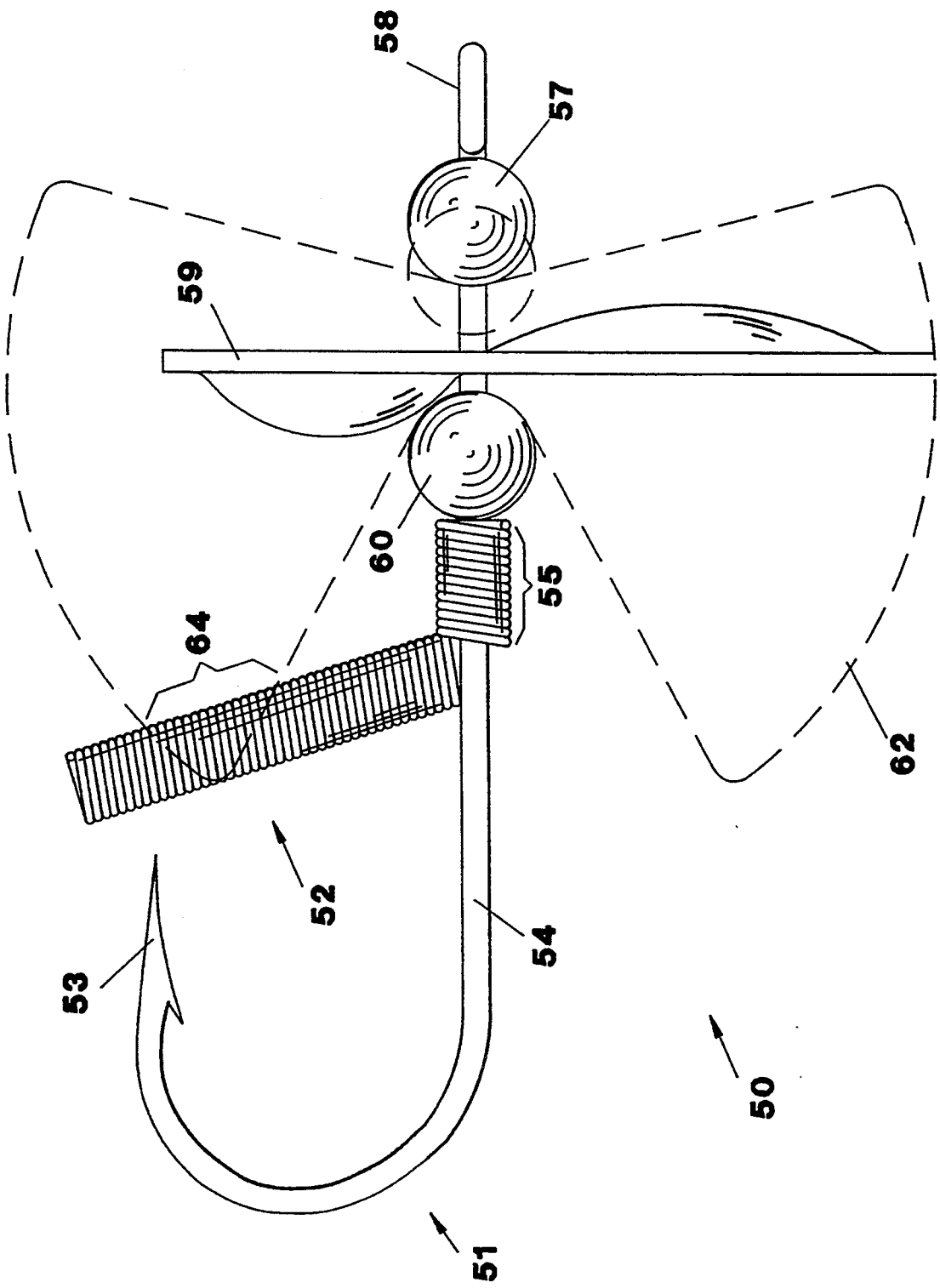
FIG. 9 is an elevational view of a spinner lure having a sheath-guard according to this invention.

Referring now to FIG. 9 which will serve to illustrate the capability of the sheath-guard of this invention to interact dynamically and synergistically with conventional dynamic elements of a fishing lure. Lure 50 has as its central structure hook 51 and is assembled by sequentially passing the elements that make up the lure over the point 53 of hook 51 and onto the shank 54 of the hook 51 so that the last element to be added to the assembly is the sheath-guard 52 of this invention. The shank segment 55 of sheath-guard 52 is secured to shank 54 of hook 51 by means of soldering.

A glow bead is a component of spinner type baits. It is made of fluorescent material and emits light in dark water. A first bead 57 which is preferably a glow bead is the first element of the assembly of lure 50. It is free to rotate and translate on shank 54. It is retained on shank 54 by eye 58. The next element of the assembly of lure 50 is a spinner blade 59 which is of the type wherein the shaft about which the spinner spins passes through the spinner. Spinner blade 59 is free to rotate and translate on shank 54. The next element of the assembly of lure 50 is a second bead 60. First bead 57, spinner blade 59, and second bead 60 are then positionally limited in their movement by the securement of shank segment 55 of sheath-guard 52 to shank 54.

When lure 50 is moved through the water, spinner blade 59 is caused to rotate about shank 54. The dynamics of spinner blade 59 gives it an oscillating wobble about shank 54. Dashed lines 61 delineate the approximate zone of combined rotation, oscillation, and wobble of blade 59. The pressure of the water against first bead 57 causes it to press against spinner blade 59 and to partake of the oscillating movement of blade 59. Dashed lines 63 delineate the approximate zone of oscillation of bead 57. When sheath-guard 52 is moved through the water it is caused to oscillate and vibrate. Dashed lines 62 delineate the approximate zone of oscillation of sheath-guard 52. As spinner blade 59 rotates and oscillates and bead 57 partakes of the oscillatory movement of blade 59, light emitted and/or reflected from beads 57 and 60 is reflected from blade 59 and sheath-guard 52 is continuously changing patterns due to the dynamics of the three moving elements. For a time, when passing through the water a regular rate, these elements will fall into a somewhat regular pattern of rotation, translation, and oscillation. However, periodically, and irregularly, blade 59 and sheath-guard 52 move into their overlap zone 64 where they come into contact with an audible collision which disrupts and alters the rotations, oscillations and translations of all the components. The inventor believes that his invention of a coil spring sheath-guard that participates in and modifies the dynamics of the conventional elements of a fishing lure is novel in the art.

Figure 10:
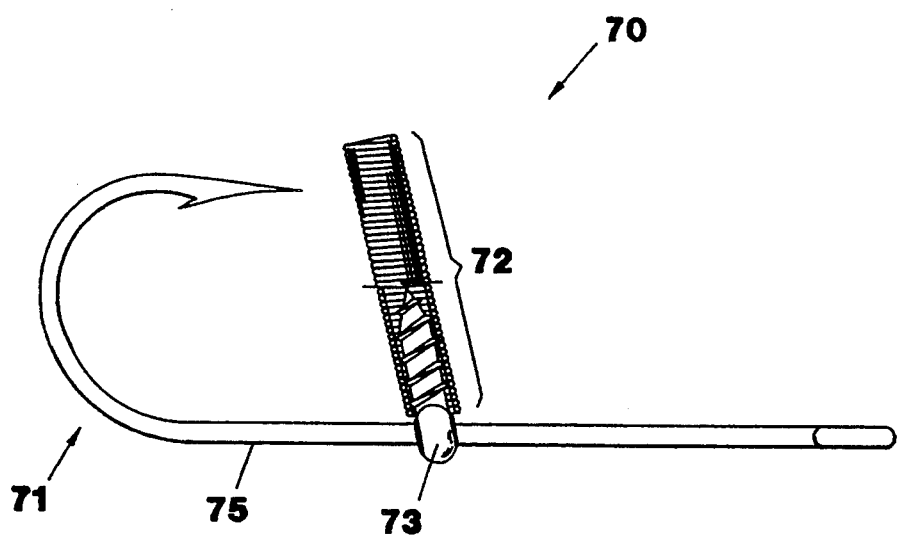
FIG. 10 is a partially sectioned elevational view showing a means for detachably securing a sheath-guard of this invention to a hook.

Referring now to FIG. 10 wherein lure 70 comprises hook 71 which has secured to its shank 75 a threaded pin 73. Pin 73 is secured to shank 75 by means of soldering. Sheath-guard 72 is attachable with and detachable from lure 70 by means of threading sheath-guard 72 onto and off from threaded pin 73. The embodiment of FIG. 10 serves to provide an example of a mounting means by which sheath-guards made according to this invention may be rendered readily removable and replaceable.

Figure 11:
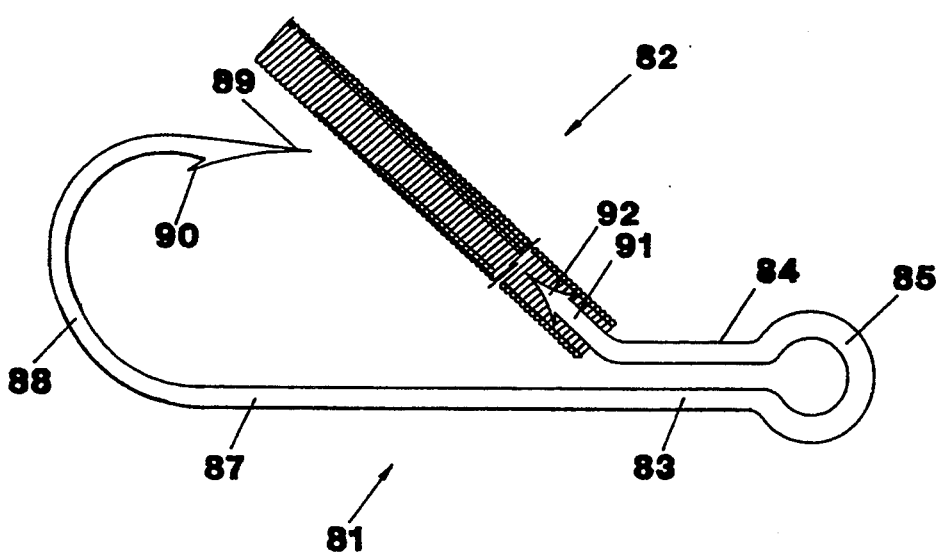
FIG. 11 is a partially sectioned view of showing a way of configuring a wire hook so as to provide a means for detachably mounting a sheath-guard of this invention thereto.

Referring now to FIG. 11 wherein a unitary took structure 81 is configured so as to detachably receive coil spring-guard 82. Hook structure 81 is formed by bending a single length of wire back upon itself to form an eye 85 from which two segments project; a hook segment 83 and a post segment 84. Hook segment 83 is formed into a hook 86 having a shank 87, a bend 88, a point 89 and a barb 90 as is conventional. Post segment 84 is formed into a coil spring sheath-guard receiving mounting post 91. Post 91 is deformed as at end 92 so that end 92 mechanically engages the resilient coils of sheath-guard 82 in engagement with post 91. The unitary hook 81 of FIG. 11 serves to illustrate the inventors creation of a unitary hook structure that enables the formation of a hook structure of a single length of wire onto which a sheath-guard with a hollow shaft may be detachably secured.

Figure 12:
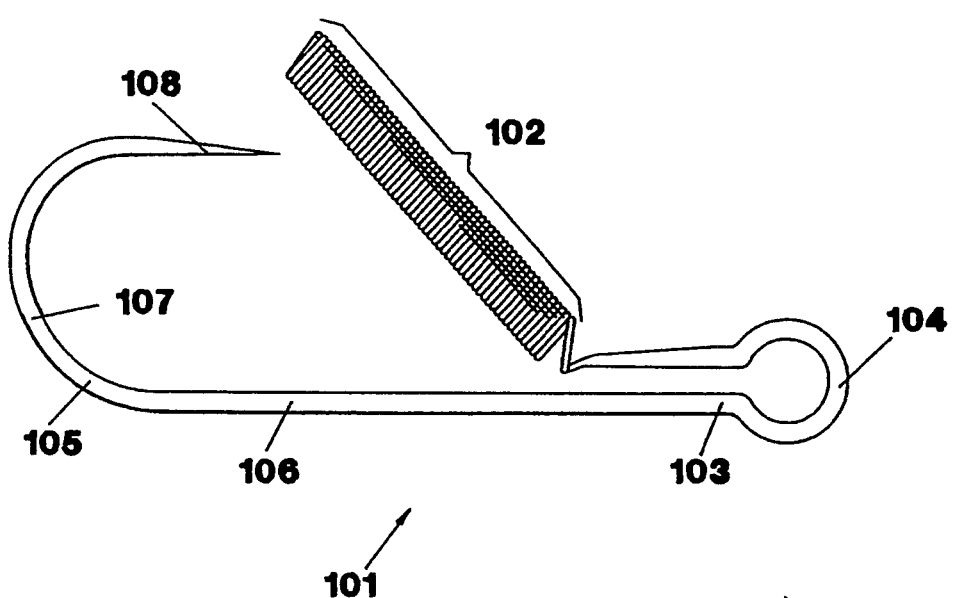
FIG. 12 is an elevational view of the lure of this invention wherein a sheath-guard is formed as an integral part of the hook.

Referring now to FIG. 12 wherein an unitary barbless hook structure 101 is formed by coiling a single length of wire to form sheath-guard 102 and bending this single length of wire back upon itself to form an eye 104 from which a hook segment 103 projects. Hook segment 103 is formed into hook 105 having a shank 106, a bend 107 and a point 108. The unitary hook 101 of FIG. 12 serves to illustrate the inventors creation of a unitary hook and coil spring sheath-guard made from a single length of wire.

Figure 13:
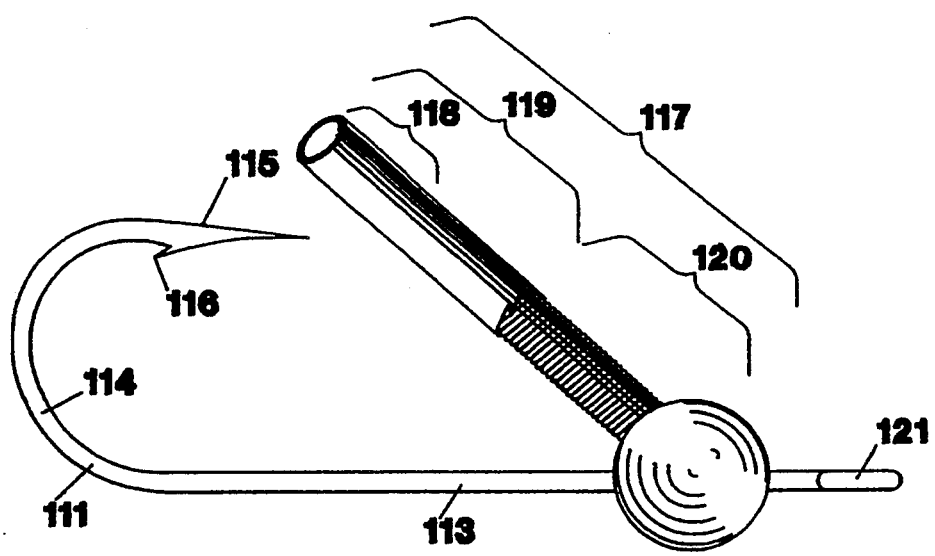
FIG. 13 is a pictorial view of a lure embodying a sheath-guard of this invention having a tubular sheath attached to a coiled spring shaft.
Figure 14:
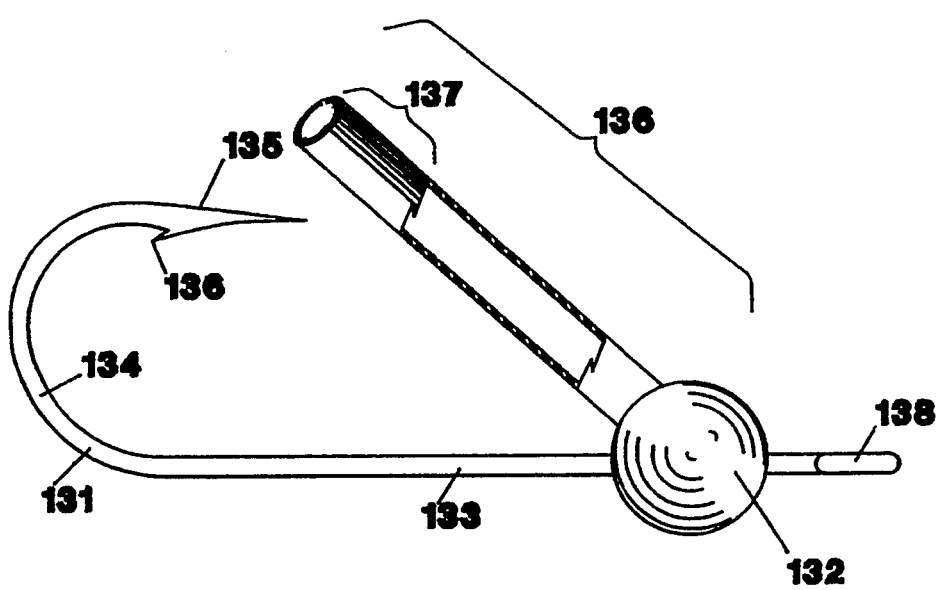
FIG. 14 is a pictorial view of a lure embodying a sheath-guard of this invention having a tubular sheath and a tubular shaft.
Figure 15:
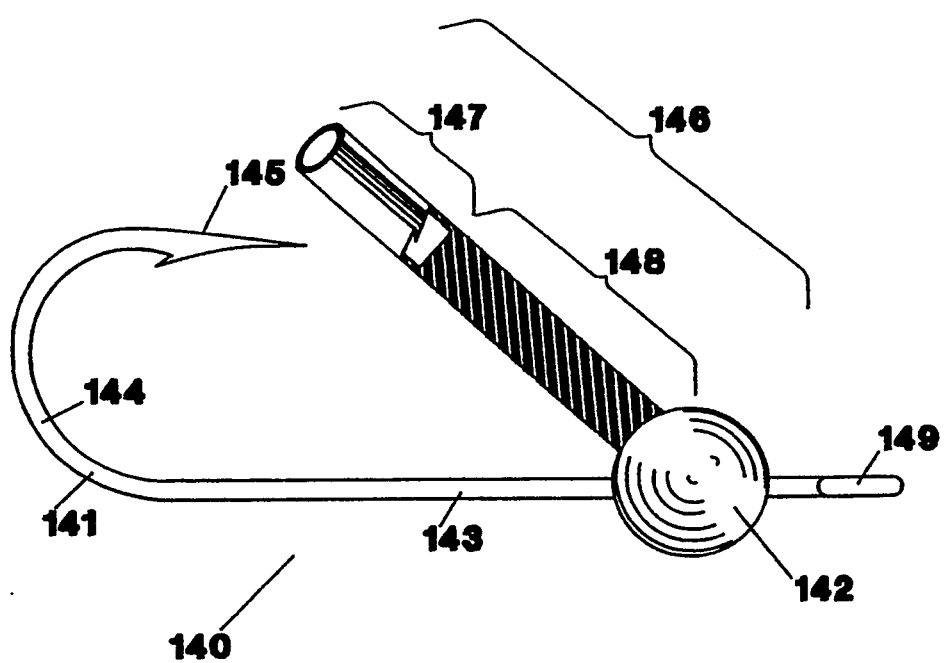
FIG. 15 is a pictorial view of a lure embodying a sheath-guard of this invention having a tubular sheath and a solid flexible shaft.

Referring now to FIGS. 13, 14, and 15 which serve to show sheath-guards of this invention wherein the sheath segments 118, 137, and 147 are tubular; and wherein the molded-in fixed end of the shaft segments are comprised of 3 different flexible materials. In FIG. 13 the shaft has as part of its construction a coiled spring 120, whereas in FIG. 14 the shaft is composed of a tubular material 139 and in FIG. 15 the shaft is made from a solid flexible rod 148; and shows how sheath-guard shafts need only be made from flexible resilient materials to serve their supportive and deflective purpose. FIGS. 13, 14 and 15 illustrate jigs having sheath guards fixed to the jig body by means of molding the shaft within the metallic or polymeric body to produce a sinking or floating lure. It is within the spirit of this invention and the inventor believes it to be novel in in the art to create lures having molded bodies with single or multiple sheath-guarded hooks molded within the lure body.

Figure 16:
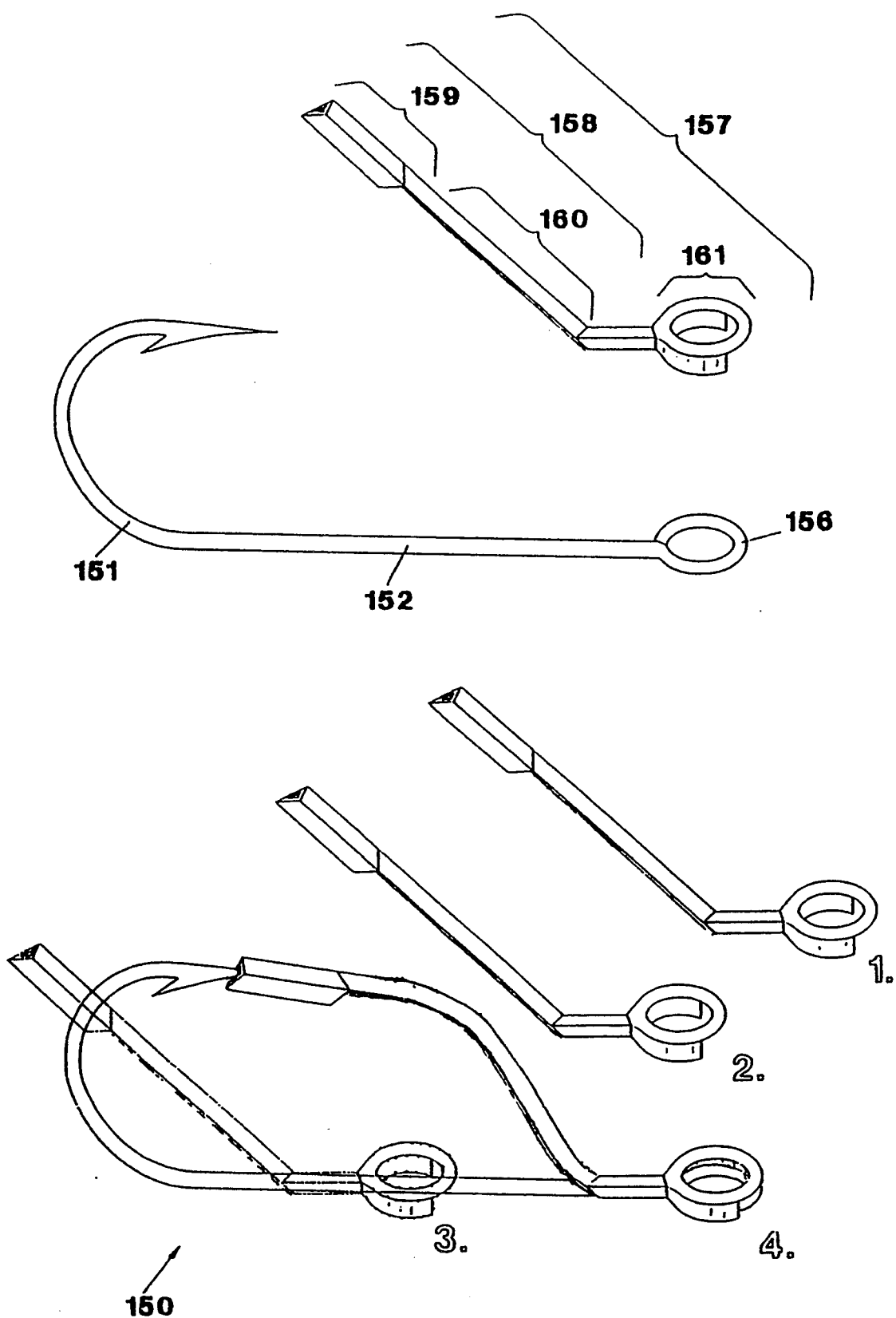
FIG. 16 is a partially sectioned view showing a way of configuring a sheath-guard assembly so as to provide a means for detachably mounting a sheath-guard assembly of this invention.

Referring now to FIG. 16 which serves to illustrate a means for detachably attaching a sheath-guard 158 of this invention to a hook 151 by means of frictionally snapping the head 161 of the sheath-guard assembly 157 over the hook eye 156 as it is guided over the shank 152 so as to assemble weedless lure 150. This illustrates one means for attaching a sheath-guard assembly to a single hook. As illustrated the sheath-guard assembly 157 is composed of an open ended encasing sheath 159 attached to a flat thin flexible shaft 160 which is attached to a snap-on head 161 which conforms to the hook eye for a frictional fit and may be composed of material from the group consisting of preformed metals, and thermoformed polymers. As further example an attachable unitary sheath-guard assembly may be made from a singular length of hollow material such as flexible urethane tubing which has had one end thermoformed to conform and frictionally fit over the hook eye. While not illustrated, attachable sheath-guards for multiple hook assemblies such a double and treble hooks are within the spirit of this invention and may be attached by frictionally conforming to the hook eye from either the front or the back of the hook eye and may be composed of materials from the group consisting of preformed metals, thermoformed polymers and combinations thereof.

Figure 17:
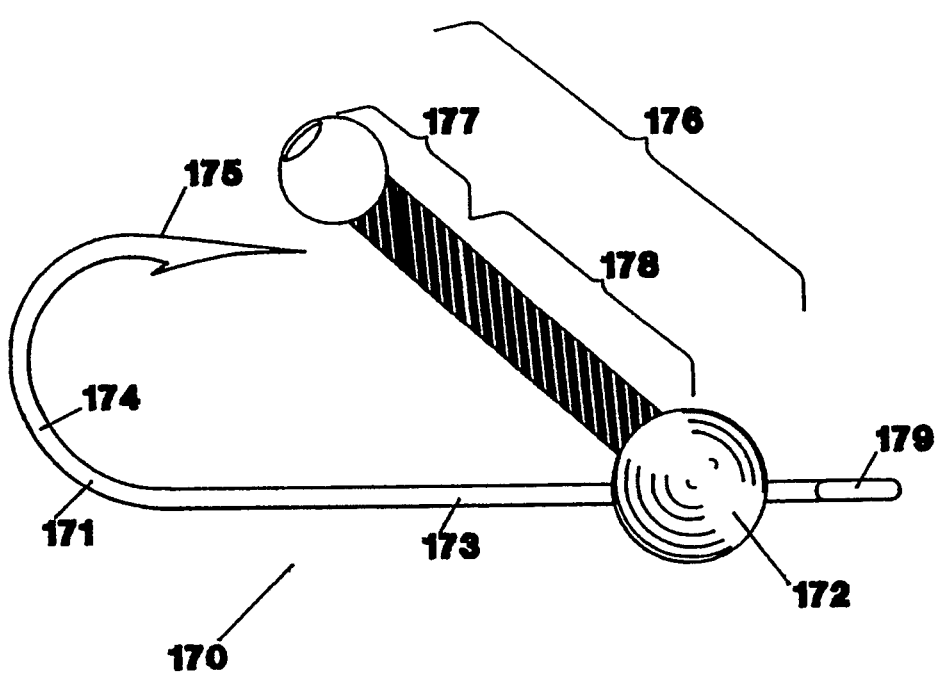
FIG. 17 is a pictorial view of a lure embodying a sheath-guard of this invention having a spherical sheath and a solid flexible shaft.

Referring now to FIG. 17 which illustrates a sheath-guard 176 fixed to lure 170 whereby the sheath segment 177 is comprised of a hollow spherical flexible resilient polymer which has been thermoformed to that shape and is attached to a solid flexible shaft segment 178 which has been thermoformed simultaneously with the sheath segment 177 and the polymeric body 172 around the hook shank to form a molded in place sheath-guarded lure 170. A black dot has been painted onto the spherical sheath so as to imitate a fish eye.

EXAMPLE

An Eagle Claw model 202 gold aberdeen hook size 1 has affixed to it by soldering a 0.068 inch outside diameter stainless steel coiled spring made from 0.012 inch diameter wire so as to serve as a sheath-guard. A second Eagle Claw model 202 gold aberdeen hook size 1 has affixed to it by soldering a 0.068 inch outside diameter stainless steel coiled spring made from 0.012 inch diameter wire so as to serve as the shaft segment for a sheath-guard and has a sheath segment comprised of a 0.25 inch diameter hollow metal brass bead having a hole diameter of 0.068 inches which has been fixed by soldering to the end of the coiled spring so as to serve as a hollow sheath. This hollow bead was painted with a white dot to imitate the eye of a fish. A third hook of the same design was fixed with a sheath-guard having a 0.25 inch diameter hollow glow bead melted into the end of a coiled spring with the glow bead serving as a hollow encasing sheath and with it having black painted dots on each side so as to imitate the eye of a fish. These three hooks were fished with nightcrawlers for bass. The fisherman noted that the bass were striking the lures with the beaded eye sheaths unsprung directly in front of the hook tip much more frequently than the hook without the bead eye and that he was hooking more fish on the beaded eye sheaths as they were attacking the simulated eye. Additionally, the fisherman packed the hollow metal bead with a waxy scent attractant so as to add both sight and scent to the beaded eye sheath and further increased the frequency of fish strikes.

It is well known in the art of fishing that fish eyes attract the fish to a lure and that predator fish attack the head of the smaller fish by zeroing in on the eye of the fish and in fact most lures have a round painted eye for this purpose. The problem with most lures is that the placement of the attracting eye is toward the front of the lure and away from where the hook point is thereby reducing the hooking percentage when the predator fish strikes the lure eye. The inventor believes that his invention of a bead eye sheath mounted on the unfixed end of a sheath-guard which puts an imitation fish eye directly in front of a hook point to increase fishing success when the predator bites the fish eye and gets hooked, and which serves as a hollow rounded end weedguard when fished, and which serves as a hook protector when not in use for fishing is novel in the art.

An enabling disclosure of the invention in its simplest forms is provided above. A representative sample of embodiments of lures which incorporate the invention in various ways has also been provided above. To set forth all of the combinations and variants of there combinations that would become apparent to one skilled in the art would greatly multiply the drawings and cause the specifications to become prolix. Therefore, the scope of this invention should not be limited by the embodiments disclosed, but the scope of this invention should be limited only by the scope of the appended claims and all equivalents thereto that would become apparent to one skilled in the art.

I claim:

1. A fishing lure, comprising; in combination, at least one hook; said hook having a shank, a bend, a point, and a barb, and having a sheath-guard in the form of a coil spring, said coil spring having one end fixed to the lure at a point of attachment at a location that is in the direction in which the point is directed; and the coil spring has a length greater than the distance between the point of attachment and the point of the hook; whereby said coil spring acts as a flexible, deflective guard when positioned in front of the hook during fishing and; the spring is positionable by manually flexing the other end of the coiled spring toward the point of the hook so that the point of the hook is insertable into the coil spring, thereby establishing a latching engagement of the coiled spring with the hook to provide a protective safety sheath such that the coil spring is in a latching engagement with the barb between two adjacent spring coils thereby acting as a latching protective safety sheath when not in use for fishing.

2. The lure of claim 1 wherein the coil spring is fixed on the shank of the hook by spirally wrapping a segment of the coil spring around the shank of the hook and then applying a fixing means thereto.

3. The lure of claim 1 wherein the coil spring sheath-guard is stretchable when pulled through the water while fishing thereby causing a pulsing attracting sonic and visual vibration of the spring as it is retrieved while deflecting water and underwater objects.

4. The lure of claim 1 wherein the lure has a body with a coil spring receiving hole, and the sheath-guard is fixed on the body.

5. The lure of claim 1 wherein the lure has a multiplicity of hooks and each hook is provided with a coil spring sheath-guard.

6. The lure of claim 1 wherein the lure has at least one dynamic component mounted on the shank of the hook and that dynamic component interacts with the coil spring sheath-guard to provide a fish attractant not provided by either the sheath-guard or the dynamic component acting separately.

7. The lure of claim 6 wherein said dynamic elements mounted on the shank of the hook comprising:
   a) a first bead,
   b) a spinner blade,
   c) a second bead, whereby the spinner blade when rotated causes the first bead to oscillate up and down the hook shank creating a rattling effect and causing the sheath-guard to vibrate as the blade contacts the sheath-guard during rotation creating a synergistic rattling affect and a visual vibrational luring affect.

8. The lure of claim 1 wherein the coil spring is detachably fixed to the lure by a threadable means.

9. The lure of claim 1 wherein the hook and the coil spring sheath-guard are made from a single length of wire into a unitary construction.

10. A fishing lure, comprising; in combination, at least one hook formed from a wire; said hook having a shank, a bend, and a point, and having a sheath-guard in the form of a coil spring, said coil spring having one end fixed to the lure at a point of attachment at a location that is in the direction in which the point is directed; and the coil spring has a length greater than the distance between the point of attachment and the point of the hook; whereby said coil spring acts as a flexible, deflective guard when positioned in front of the hook during fishing and; the spring is positionable by manually flexing the other end of the coiled spring toward the point of the hook so that the point of the hook is insertable into said other end of the coil spring and said other end of coil spring passed beyond the hook point up against a point where the transverse dimension of the hook wire is equal to the inside diameter of the coil thereby establishing a latching engagement of the coiled spring with the hook to provide a safety sheath when not in use for fishing.

11. The lure of claim 10 wherein the coil spring is fixed on the shank of the hook by spirally wrapping a segment of the coil spring around the shank of the hook and then applying a fixing means thereto.

12. The lure of claim 10 wherein the coil spring sheath-guard is stretchable when pulled through the water while fishing thereby causing a pulsing attracting sonic and visual vibration of the spring as it is retrieved while deflecting water and underwater objects.

13. The lure of claim 10 wherein the lure has a body with a coil spring fixed on the body.

14. The lure of claim 10 wherein the lure has a multiplicity of hooks and each hook is provided with a coil spring sheath-guard.

15. The lure of claim 10 wherein the lure has at least one dynamic component mounted on the shank of the hook and that dynamic component interacts with the coil spring sheath-guard to provide a fish attractant not provided by either the sheath-guard or the dynamic component acting separately.

16. The lure of claim 15 wherein said dynamic elements mounted on the shank of the hook comprising:
   a) a first bead,
   b) a spinner blade,
   c) a second bead, whereby the spinner blade when rotated causes the first bead to oscillate up and down the hook shank creating a rattling effect and causing the sheath-guard to vibrate as the blade contacts the sheath-guard during rotation creating a synergistic rattling affect and a visual vibrational luring affect.

17. The lure of claim 10 wherein the coil spring is detachably fixed to the lure by a threadable means.

18. The lure of claim 10 wherein the hook and coil spring sheath-guard are made from a single length of wire into a unitary construction.

* * * * *